UNITED STATES PATENT OFFICE.

JAMES ALFRED KENDALL, OF LONDON, ENGLAND.

MANUFACTURE OF DINITRO-BENZOLE FROM GAS OBTAINED BY DISTILLATION OF COAL.

SPECIFICATION forming part of Letters Patent No. 252,473, dated January 17, 1882.

Application filed July 5, 1881. (No specimens.) Patented in England February 9, 1881.

*To all whom it may concern:*

Be it known that I, JAMES ALFRED KENDALL, of London, England, have invented a certain new and useful method of treating gas containing benzole or nitro-benzole for the purpose of obtaining dinitro-benzole directly therefrom, of which the following is a specification.

My said invention consists in the method or process of obtaining dinitro-benzole by the separation of the same from the benzole or nitro-benzole already existing in gas obtained from coal and other carbonaceous substances, which consists in passing the gas through a mixture of nitric acid and sulphuric acid, the latter being in excess.

For the purpose of carrying out my invention I select such coals or carbonaceous substances as produce a gas rich in benzole, and I submit the said coals or carbonaceous substances to the process of destructive distillation in the ordinary way, and separate the tarry matters and other impurities from the gas produced by deposition or any other well-known process. I then pass the gas thus purified through sulphuric acid, either cold or heated, with a view to further separating impurities which would interfere to some extent with the economic working of the process of obtaining the dinitro-benzole. I prefer to effect this operation in the following way: Two vessels of suitable material — such as earthenware or glass—having been conveniently arranged, I place in the first cold concentrated sulphuric acid and in the second gently-heated concentrated sulphuric acid. The gas is then allowed to bubble up through the acid in the first vessel and thence through that in the second vessel.

In order to obtain dinitro-benzole from the before-mentioned gaseous compounds, when they have not been previously treated for obtaining nitro-benzole, I proceed as follows: A vessel or vessels of suitable material—such as earthenware or glass—is or are provided. Into one or more of these vessels I put a mixture of nitric acid with sulphuric acid, having an excess of sulphuric acid, the said mixture being composed of about one part of nitric acid and about five parts of sulphuric acid. The gas is then conducted to the said vessel or vessels and allowed to bubble up through the said mixture of acids contained therein. The effect of the said mixture upon the gas is to absorb the benzole suspended therein and to convert it into dinitro-benzole, which remains with the acid mixture in the vessel or vessels employed. The last-mentioned vessel or vessels may be arranged in connection with the vessels containing the sulphuric acid for completing the purification of the gas, so that the gas will pass directly from the last-mentioned vessels into the vessel or vessels containing the acid mixture.

Hitherto the manufacture of nitro-benzole from gas containing benzole by means of nitric acid or mixtures containing nitric acid has been found to be too expensive to be employed for producing nitro-benzole for commercial purposes, owing to the fact that a quantity of the nitro-benzole (which is of a volatile nature) formed passes away in the form of vapor. With the gas, however, I overcome such objection by obtaining in the form of dinitro-benzole the nitro-benzole so carried away. To effect this object I pass the gas, as it escapes from the vessel or vessels containing the nitric acid employed for obtaining the nitro-benzole, as will be well understood, through a vessel or vessels of suitable material—such as earthenware or glass—containing a quantity of the mixture hereinbefore described of nitric acid with an excess of sulphuric acid, so that the gas will bubble up through the said mixture, by which means the nitro-benzole contained in the gas is converted into dinitro-benzole and remains with the acid mixture in the vessel or vessels employed.

In both the above cases, when the acid mixture is almost or quite saturated with benzole, as will be well known to persons acquainted with chemical operations, the said mixture is allowed to run out at stop-cocks placed at the bottom of the vessel or vessels. On then diluting the acid mixture with water the dinitro-benzole can be separated and washed in the usual way.

In obtaining dinitro-benzole as hereinbefore described, although in every case I employ an excess of sulphuric acid, I do not confine myself to the exact proportions of the acids in the mixture above mentioned, as it will be readily understood that it will be necessary to vary such proportions with the different kinds of gas used.

Instead of using nitric acid, mixtures of any salt of nitric acid with sulphuric acid can be employed.

I am aware that nitro-benzole has heretofore been obtained from gas containing benzole by the action of nitric acid or mixtures containing nitric acid. I make no claim thereto, but

What I claim is—

A process whereby dinitro-benzole may be obtained from benzole or nitro-benzole existing in gas produced from carbonaceous substances, which consists in passing the latter through a mixture of nitric and sulphuric acids, the latter being in excess.

JAMES ALFRED KENDALL.

Witnesses:
 GEO. S. VAUGHAN,
  67 *Chancery Lane, London.*
 JOHN DEAN,
  17 *Gracechurch Street, London.*